United States Patent [19]

Softly

[11] 4,365,866

[45] Dec. 28, 1982

[54] LIGHT MASKING DEVICE

[75] Inventor: Peter Softly, Toronto, Canada

[73] Assignee: Invisible Optics Inc., Toronto, Canada

[21] Appl. No.: 214,710

[22] Filed: Dec. 10, 1980

[51] Int. Cl.³ .............................................. G02B 27/00
[52] U.S. Cl. ................................................ 350/276 R
[58] Field of Search ..................... 350/58, 59, 60, 263, 350/268, 269, 270, 276 R, 276 SL, 284; 362/279, 290, 292, 325, 354

[56] References Cited

U.S. PATENT DOCUMENTS 1,400,926  12/1921  Wood ............................... 362/284 X
3,049,962  8/1962  Denecke ........................ 362/354 X

FOREIGN PATENT DOCUMENTS 2317642  10/1974  Fed. Rep. of Germany ... 350/276 R

*Primary Examiner*—John K. Corbin
*Assistant Examiner*—Matthew W. Koren
*Attorney, Agent, or Firm*—Ridout & Maybee

[57] ABSTRACT

A light masking device in accordance with the present invention comprises a support frame adapted to be positioned in front of the screen and an optical filter supported thereby, the optical filter comprising a grating of spaced, elongated planar slats extending horizontally across the width of the screen, the slats being differentially inclined from the horizontal in the directions of their widths so as to converge on a horizontal line at a selected height and a selected distance from the screen. In a preferred embodiment of the invention the slats are pivotally connected to the support frame for pivotal movement about respective horizontal axes, and means are provided for differentially adjusting the inclinations of the slats for selectively adjusting the position of the horizontal line on which the inclined slats converge.

11 Claims, 8 Drawing Figures

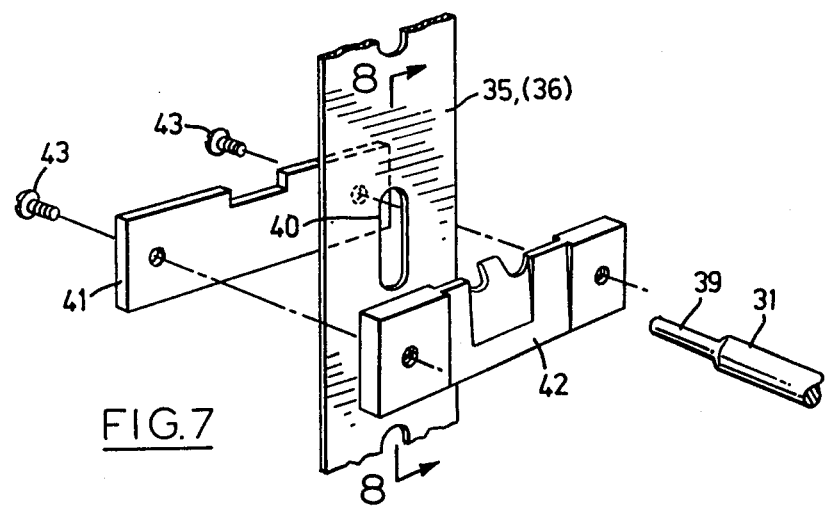
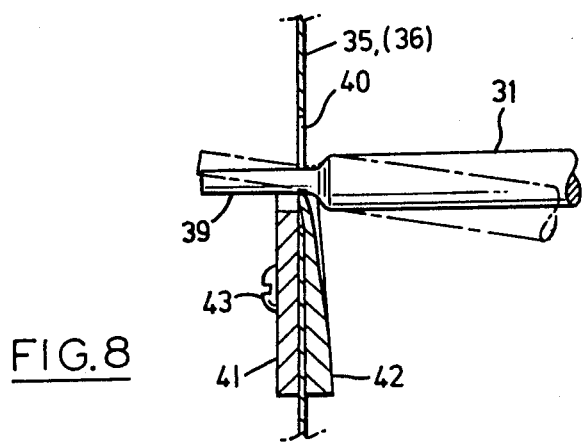

LIGHT MASKING DEVICE

This invention relates to a light masking device for improving image contrast on a television or similar video display screen under conditions of high ambient light. The device is of the type having an array of light intercepting surfaces which extend across the field of view for intercepting ambient light and which are oriented so as not to interfere with viewing from the normal viewing direction.

Devices of this general type have previously been proposed, examples of such devices being described in U.S. Pat. Nos. 2,388,203, 3,582,189 and 4,165,920. A somewhat similar device, adapted for use as a light shield for a camera, is described in U.S. Pat. No. 2,373,936. These prior devices have but limited application. Since their light intercepting elements are oriented so as to lie in parallel planes extending in a predetermined viewing direction, they preclude interference-free viewing from any position which is offset from the predetermined viewing direction or any position at which the effect of parallax is significant. Such devices are quite unsuitable for use with a video display screen such as, for example, a studio monitor screen, which has to be viewed from a selected camera position.

It is one object of the present invention to provide a light masking device for use with a studio monitor screen wherein the light intercepting elements are oriented so as to permit substantially interference-free viewing from a selected viewing position.

Another object of the invention is to provide such a light masking device in which the orientations of the light intercepting elements can be adjusted to suit changes of the viewing position.

A light masking device in accordance with the present invention comprises a support frame adapted to be positioned in front of the screen and an optical filter supported thereby, the optical filter comprising a grating of spaced, elongated planar slats extending horizontally across the width of the screen, the slats being differentially inclined from the horizontal in the directions of their widths so as to converge on a horizontal line at a selected height and a selected distance from the screen.

In a preferred embodiment of the invention the slats are pivotally connected to the support frame for pivotal movement about respective horizontal axes, and means are provided for differentially adjusting the inclinations of the slats for selectively adjusting the position of the horizontal line on which the inclined slats converge.

In order that the invention may be readily understood, one preferred embodiment thereof will now be described by way of example with reference to the accompanying drawings, in which:

FIG. 7 is an exploded view of a clamp forming part of the adjustment mechanism; and FIG. 8 is a section on line 8—8 in FIG. 7.

Figure 2:
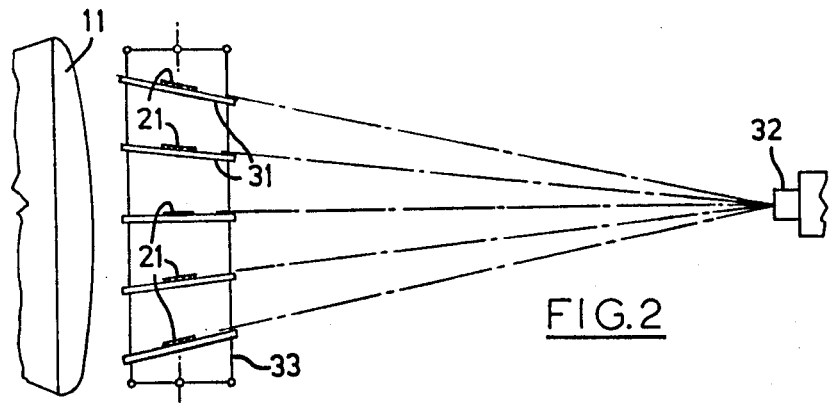
FIGS. 2, 3 and 4 are simplified diagrams illustrating the principle of adjustment of the device to suit different viewing positions.
Figure 3:
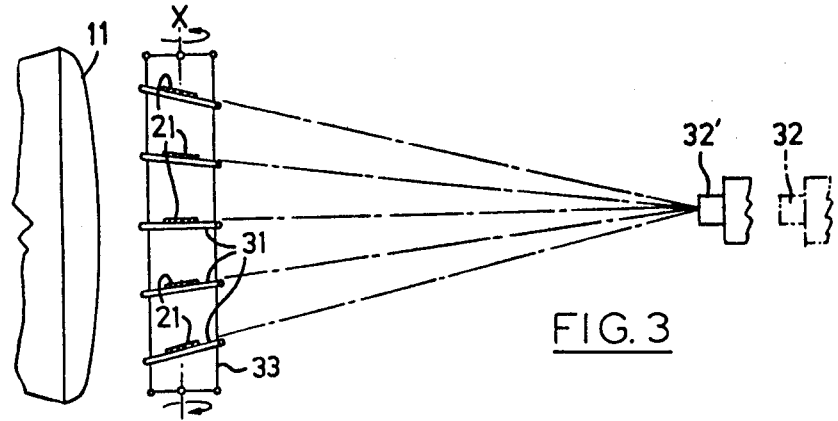
Figure 4:
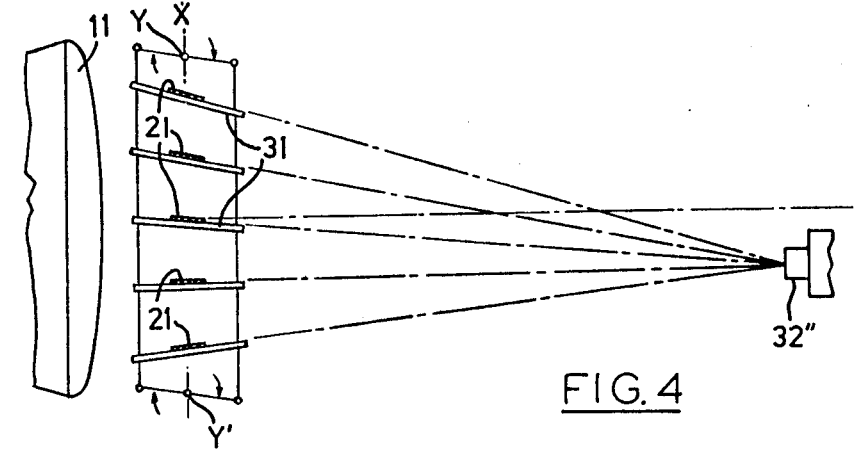

The light masking device illustrated in the drawings comprises a rectangular rigid support frame 10 which is adapted to be positioned in front of the screen of a television studio monitor 11 (FIGS. 2, 3 and 4). The support frame consists of a pair of upright end members 12, 13 and a pair of upper and lower cross members 14, 15. The support frame defines a rectangular viewing opening which obviously must be large enough to permit uninterrupted viewing of the monitor screen 11 when it is operatively positioned. Also mounted at the ends of the cross members 14, 15 are pairs of brackets 16, 17 and 18, 19 which provide pairs of aligned pivots for the purpose hereinafter described.

Figure 5:
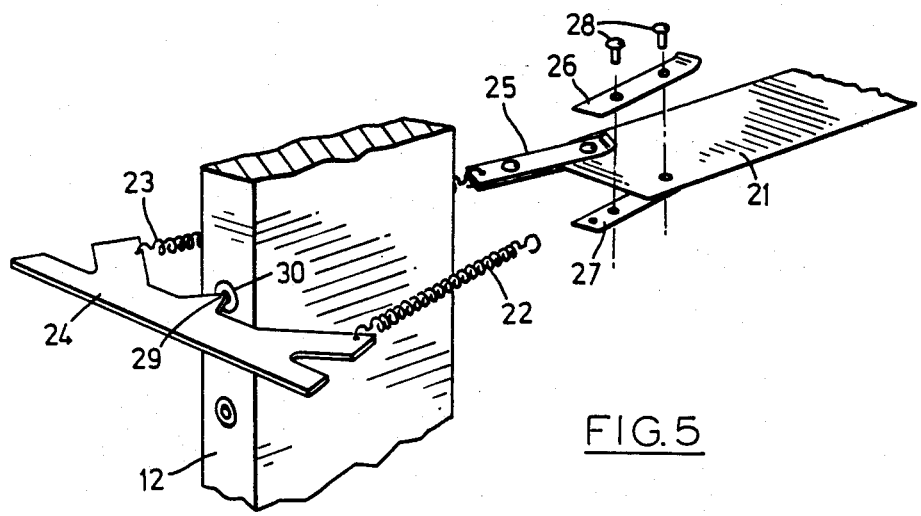
FIG. 5 illustrates a pivotal mounting of one of the light intercepting elements or slats.

Supported by the support frame 10 is an optical filter 20 comprising a grating of spaced, elongated planar slats 21 which extend horizontally across the width of the support frame within the rectangular viewing opening. These slats are preferably of stainless steel, typically 0.002 inches in thickness, and their opposite sides are treated to provide matt, substantially non-reflecting light intercepting surfaces. Each slat 21 is supported under tension in the direction of its length, by means illustrated in detail in FIG. 5. As shown in FIG. 5, the end of the slat 21 is connected via a pair of tension springs 22, 23 to a pivot bar 24. The connections between the slat and the tension springs are effected by means of connectors 25 each consisting of a pair of thin flexible metallic strips 26, 27 between which the end of the slat is sandwiched, the strips 26, 27 being secured together by rivets 28.

The pivot bar 24 has a pointed bearing projection 29 which engages in a locating recess 30 of the frame member, thus defining a pivotal connection to the frame member. The other end of the slat 21 is similarly connected to the opposite frame member 13, the two pivotal connections being horizontally aligned with one another; the slat is thus pivotally connected to the support frame and thereby mounted for pivotal movement about a horizontal axis.

Figure 1:
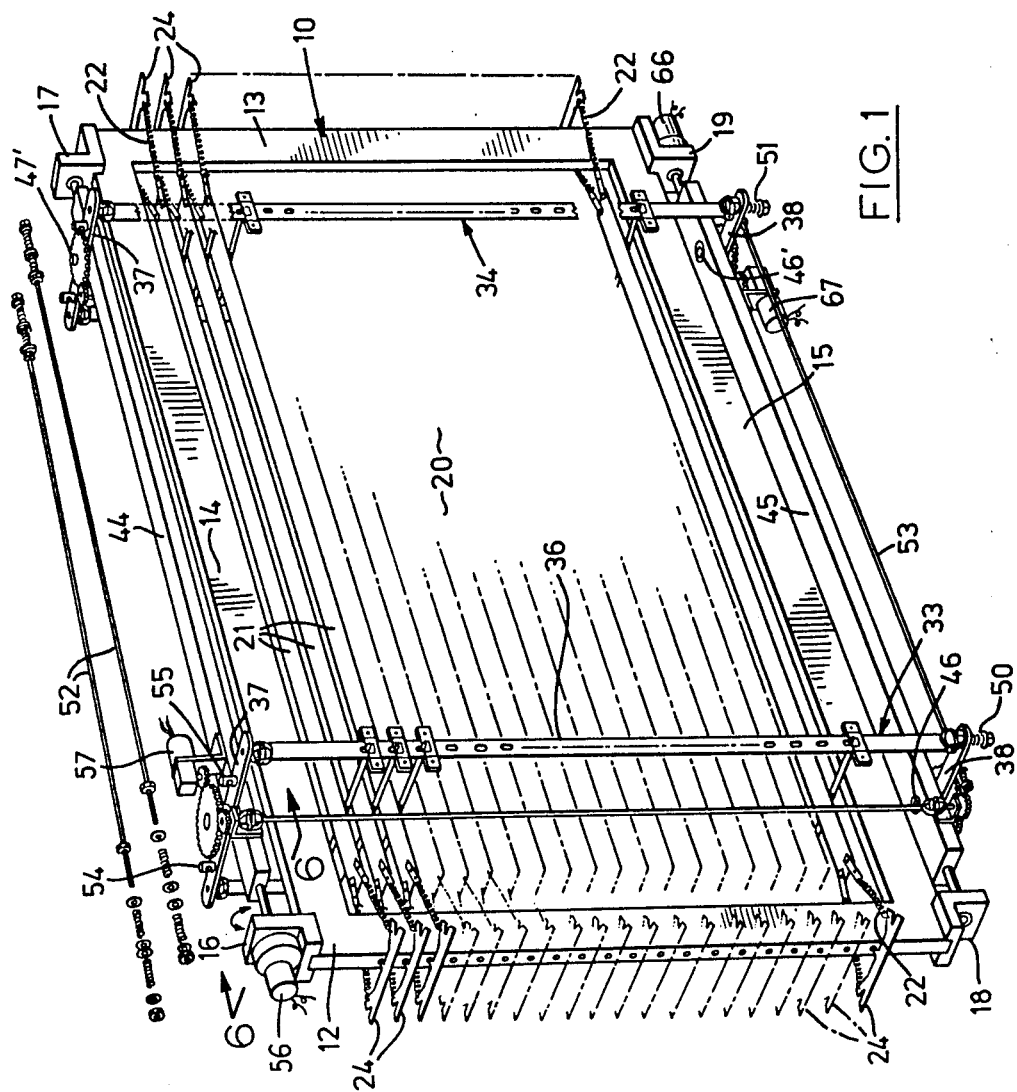
FIG. 1 is a general perspective view of the device, part of the adjustment mechanism being shown in exploded view for clarity of illustration.

All the slats 21 of the grating are similarly mounted for pivotal movement about respective horizontal axes, as illustrated in FIG. 1. The horizontal pivotal axes of the slats are preferably equally spaced apart. However, as illustrated in FIG. 2, the slats 21 do not lie in parallel planes but are constrained by bearing links 31 to lie in planes which are differentially inclined with respect to the horizontal so as to converge on a horizontal line at a selected height and a selected distance from the screen 11. The selection of height and distance depend upon the position chosen for the television camera 32, of course, which in FIG. 2 is horizontally aligned with the centre of the screen 11. In a television studio most of the ambient light falls towards the monitor screen from an upward direction rather than from the side, and so the horizontally extending slats 21 are suitably positioned to intercept this light which would otherwise be reflected from the screen and impair the quality of the image. At the same time all the slats 21 are viewed edge on by the camera 32, and so do not interfere with normal viewing of the image except to the extent of their thickness which is minimal.

It will be appreciated that the diagrammatic drawings do not necessarily show the recommended spacings of the slats, which must be chosen according to studio working requirements.

In a light masking device according to the present invention the slats 21 may be set at predetermined inclinations, corresponding for example to the grating configuration shown in FIG. 2. In this case the device may only be used with a television camera positioned as shown in FIG. 2. However, in the present example the slats can be differentially adjusted to suit a range of camera positions. For this purpose the bearing links 31 which constrain the slats form parts of a parallel linkage mechanism 33. In fact, as shown in FIG. 1 and as hereinafter described, there are two interconnected parallel linkage mechanisms 33, 34, but for the purpose of describing their function it will be sufficient to refer to one. The mechanism 33 can be rotated about a vertical axis X—X, as illustrated in FIG. 3, so as to vary the angles at which the bearing links 31 traverse the slats, and so to vary differentially the inclinations of the slats with respect to the horizontal. Thus, if a shorter focal distance is required, as when the camera 32 is moved to a position 32′ (FIG. 3), the parallel linkage mechanism must be rotated about the axis X—X, causing each bearing link to exert a cam action on its associated slat thereby increasing the angle of inclination of the slat. Since the slats are planar and have parallel edges, they must always lie in planes converging on a horizontal line despite such adjustment.

The end links of the parallel linkage mechanism 33 are mounted for pivotal movement about respective horizontal axes Y, Y′ (FIG. 4). By pivotally moving the end links about these axes, the inclinations of the slats are again differentially adjusted, in this case to vary the height of the line on which they converge so as to suit a new camera position, e.g. the position 32″ of FIG. 4.

Each parallel linkage mechanism 33, 34 comprises a pair of upright links 35, 36 and a pair of end links 37, 38 extending transversely to the slats 21. The bearing links 31 extend between the upright links to which they are pivotally connected at their ends in the manner shown in FIGS. 7 and 8. Each link 31 has a reduced end portion 39, at each end, which projects through a vertically elongated slot 40 in the upright link 35 or 36. The reduced end portion 39 bears on an accurately positioned bearing edge formed by a pair of adjustable clamping members 41, 42 clamped together by screws 43. Thus the orientations of the bearing links can be accurately preset. Each of the slats 21 bears on a respective one bearing link of each of the parallel linkage mechanisms 33, 34 and is constrained thereby to lie in a plane determined by the inclination of the pair of bearing links with respect to the horizontal. As previously mentioned, the end links 37, 38 are mounted for pivotal movement about respective horizontal axes Y, Y′ (FIG. 4). The end links are so mounted on elongated bars 44, 45 which are themselves pivotally connected between the pairs of brackets 16, 17 and 18, 19. The end links of each pair are also pivotally connected to the bars 44, 45 by vertically aligned, pivotal connections 46, 47 and 46′, 47′. By this means the parallel linkage mechanisms can be articulated with respect to their horizontal and vertical pivotal axes as described with reference to FIGS. 3 and 4.

Figure 6:
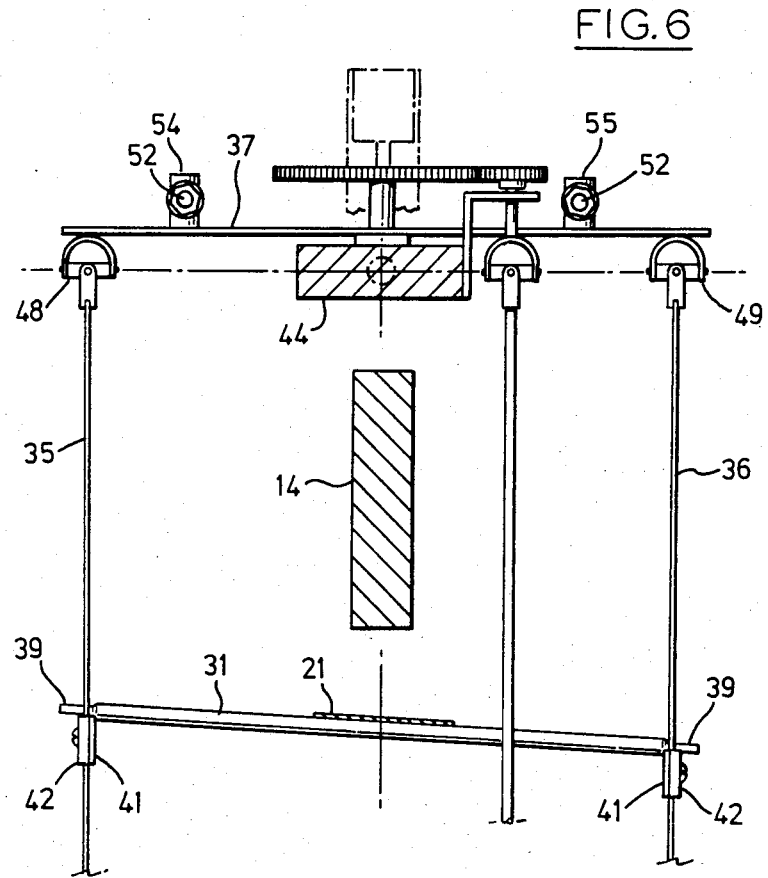
FIG. 6 is a view on line 6—6 in FIG. 1.

It is necessary that the upright links 33, 34 be universally pivoted to the end links 37, 38. Such universal pivots are shown at 48 and 49 in FIG. 6. As shown in FIG. 1, the lower ends of the upright links resiliently engage the end links by adjustable springs 50, 51. It is also necessary that the parallel linkage mechanisms be exactly complementary to one another so that the slats will remain planar and not become skew. For this purpose the corresponding end links 37, 38 of the two mechanisms are interconnected by pairs of tie rods 52, 53 which are connected at their ends to the end links by swivels 54, 55. The complementary relationship between the configurations of the parallel linkage mechanisms, once the latter have been preset, is thus maintained.

The linkage mechanisms may be adjusted manually to vary the relative inclinations of the slats to suit different viewing positions. However, in the illustrated embodiment such adjustment is accomplished by pairs of electric motors which are disposed symmetrically with respect to the device. A pair of interconnected motors 56, 66 are mounted on the brackets 16, 19 and coupled to the bars 44, 55 for tilting the latter with respect to their respective horizontal axes, thereby altering the configuration of the grating to suit different viewing heights. Another pair of motors 57, 67 are coupled to the links 37, 38 of the mechanisms 33, 34 for rotating the links in pairs with respect to their vertical pivotal axes, thereby altering the configuration of the grating to suit different viewing distances. Of course, the interconnections of the linkages ensure that the pivotal movement of any one link is accompanied by the appropriate complementary movement of each corresponding link.

What I claim is:

1. A light masking device for improving image contrast on a video display screen under conditions of high ambient light, comprising a support frame adapted to be positioned in front of the screen and an optical filter supported thereby, the optical filter comprising a grating of spaced, elongated planar slats extending horizontally across the width of the screen, the slats being differentially inclined from the horizontal in the directions of their widths so as to converge on a horizontal line at a selected height and a selected distance from the screen, wherein the slats are pivotally connected to the support frame for pivotal movement about respective horizontal axes, the device further comprising linkage means interconnected with the slats for differentially adjusting the inclinations of the slats for selectively adjusting the position of said horizontal line on which the inclined slats converge.

2. A light masking device according to claim 1, wherein the slats are supported under tension in the direction of their length.

3. A light masking device according to claim 2, wherein the slats are of stainless steel and have substantially non-reflecting surfaces.

4. A light masking device according to claim 1, wherein said linkage means comprises a parallel linkage mechanism having a pair of upright links and a pair of end links extending transversely to the slats, and a plurality of differentially inclined bearing members extending between said upright links, each slat bearing on a respective one of said bearing members and being constrained thereby to lie in a plane determined by the inclination of said bearing member, said end links being mounted for pivotal movement about respective horizontal axes for differentially adjusting the inclinations of said bearing members with respect to the horizontal.

5. A light masking device according to claim 1, wherein said linkage means comprises a parallel linkage mechanism having a pair of upright links and a pair of end links extending transversely to the slats, and a plurality of differentially inclined bearing members extending between said upright links, each slat bearing on a respective one of said bearing members and being constrained thereby to lie in a plane determined by the inclination of said bearing member, said end links being mounted for pivotal movement about a common vertical axis for varying the angle at which the bearing members traverse the slats.

6. A light masking device for improving image contrast on a video display screen under conditions of high ambient light, comprising:

a rectangular support frame adapted to be positioned in front of the screen, the support frame comprising a pair of upright end members and a pair of upper and lower cross members, an optical filter supported by the support frame, the optical filter comprising a grating of spaced, elongated planar slats extending horizontally across the width of the frame, the slats being pivotally connected at their ends to said upright frame members for pivotal movement about respective horizontal axes, the slats being differentially inclined from the horizontal in the directions of their widths so as to converge on a horizontal line at a selected height and a selected distance from the frame, and adjustment means interconnected with the slats for differentially adjusting the inclinations of the slats for selectively adjusting the position of said horizontal line on which the inclined slats converge.

7. A light masking device according to claim 6, wherein said adjustment means comprises:

a pair of complementary parallel linkage mechanisms mounted on the support frame adjacent the ends thereof, coupling means interconnecting said mechanisms and constraining said mechanisms for movement in unison, each parallel linkage mechanism comprising a pair of upright links and a pair of end links extending transversely to the slats, and a plurality of differentially inclined bearing links extending between said upright links, each slat bearing on a respective one of said bearing links of each parallel linkage mechanism and being constrained thereby to lie in a plane determined by the inclination thereof, said end links of each parallel linkage mechanism being mounted for pivotal movement about respective horizontal axes for differentially adjusting the inclinations of said bearing links with respect to the horizontal, and said end links of each parallel linkage mechanism being mounted for pivotal movement about a common vertical axis for selectively varying the angle at which the bearing links traverse the slats.

8. A light masking device according to claim 7, wherein the slats are supported under tension in the direction of their length.

9. A light masking device according to claim 8, wherein the slats are of stainless steel and have substantially non-reflecting surfaces.

10. A light masking device according to claim 7, wherein said adjustment means further comprises a first electric motor and a second electric motor mounted on the support, and first and second transmission means interconnecting said motors with said parallel linkage mechanisms for pivotally moving said mechanisms with respect to said horizontal and vertical pivotal axes, respectively.

11. A light masking device comprising a support frame defining an aperture and an optical filter supported thereby to intercept light falling on said aperture, the optical filter comprising a grating of spaced, elongated planar slats extending parallel to one another across the width of the aperture, the slats being differentially inclined in the directions of their widths so as to converge on a line extending parallel to the slats at a selected distance therefrom, wherein the slats are pivotally connected to the support frame for pivotal movement about respective longitudinal axes, the device further comprising linkage means interconnected with the slats for differentially adjusting the inclinations of the slats for selectively adjusting the position of said line on which the inclined slats converge.

* * * * *